United States Patent [19]

Kamaya

[11] Patent Number: 4,817,838

[45] Date of Patent: Apr. 4, 1989

[54] CARGO-FASTENING UNIT FOR USE WITH ROOF-CARRIERS OF VEHICLES

[75] Inventor: Masashi Kamaya, Tokyo, Japan

[73] Assignee: PIAA Corporation, Tokyo, Japan

[21] Appl. No.: 110,275

[22] Filed: Oct. 20, 1987

[51] Int. Cl.[4] ............................................. B60R 9/04
[52] U.S. Cl. .................................. 224/319; 224/323; 224/324; 224/917
[58] Field of Search ............... 224/309, 314, 315, 319, 224/322, 323, 324, 325, 917, 320; 211/70.5, 4, 59; 414/462

[56] References Cited

U.S. PATENT DOCUMENTS

| | | | |
|---|---|---|---|
| 2,772,824 | 12/1956 | Binding | 224/319 |
| 3,223,302 | 12/1965 | Helm | 224/319 |
| 3,239,115 | 3/1966 | Bott et al. | 224/319 X |
| 3,385,488 | 5/1968 | Bronson | 224/320 X |
| 3,638,844 | 2/1972 | Bronson | 224/319 |
| 3,848,785 | 11/1974 | Bott | 224/319 |
| 4,261,496 | 4/1981 | Maredt et al. | 224/315 |
| 4,312,467 | 1/1982 | Kulwin | 224/315 |
| 4,456,158 | 6/1984 | Wertz et al. | 224/316 |

Primary Examiner—Renee S. Luebke
Attorney, Agent, or Firm—Oblon, Fisher, Spivak, McClelland & Maier

[57] ABSTRACT

A cargo-fastening unit for the roof-carrier is that in a roof-carrier having a horizontal bar being fixed on the roof top of a vehicle and also having a pivotal clamping bar being in parallel to the horizontal bar and being arranged to freely pivot so as to clamp and carry cargo between the bars, the horizontal bar and the clamping bar are respectively sectionalized into two parts at a suitable position to be joined by means of a detachable coupling bar, thereby providing a mechanism of simple construction but being able to change the length of the horizontal bar and the clamping bar in the lateral direction of the cargo as required according to the the width of the cargo so as to keep the cargo from loosening or injuring the cargo or falling off the vehicle due to severe vibrations or impacts applied on to the vehicle in operation.

2 Claims, 4 Drawing Sheets

CARGO-FASTENING UNIT FOR USE WITH ROOF-CARRIERS OF VEHICLES

BACKGROUND OF THE INVENTION

1. Field of the Invention

The present invention relates to an improvement of a roof-carrier that is used for carrying a plate-shaped load of a width such as skis on a vehicle, in particular, to a cargo-fastening means.

2. Discussion of the Background

According to conventional arts, there are a number of roof-carriers in which a unit device comprising a pair of support members, which are fixedly mounted facing each other on both sides of a vehicle, and a horizontal bar which is held supported at its ends on the upper parts of the respective support members is mounted in the arrangement of a plurality of units having spacing between adjacent units in the direction of the longitude of the vehicle.

Lately, to fasten a load in the shape of a plate having an even width like a ski on a roof-carrier, a fastening means having a horizontal bar being attached on a support bar of the roof-carrier and a pivotal clamping-bar, one end of which being attached pivotingly on to the horizontal bar, has come to be employed more often to clamp and carry a load between the bars for the convenience of easy loading and safe carrying of loads.

However, the number of loads to be carried, e.g., skis, is usually determined by the number of skiers traveling together for skiing, ranging in number from one set of skis to several sets. And the fastening of set loads on to a vehicle is better achieved by changing the fastening means depending on the number of set loads. Particularly, in carrying loads like skis on a vehicle there are likely to be severe vibrations on the vehicle and loads during travel on the road. For instance, in the case of employing a fastening means for carrying three or four sets of skis to carry a single set of skis, due to lesser fastened connections among the unit fastening means which are arranged length-wise in the latitudinal direction of the vehicle and in rows in the direction of length, the impacts caused by vibrations and wind pressure are more intensively delivered to the support members and attachment bars further to all the fastening units and the loads to loosen fastenings and consequently cause a greater number of impacts on the load so as to result in injury to the same or in its falling off the vehicle, and being damaged.

3. Purpose of the Invention

The principal purpose of this invention is to provide a means of a simple construction but which is able to change the length of the horizontal bar and the clamping bar in the lateral direction of the cargo as required according to the quantity and with dimension so as to keep the cargo from being loosened at its fastenings from injuring the cargo or falling off the vehicle due to severe vibrations or impacts applied on to the vehicle in operation.

SUMMARY OF THE INVENTION

One feature of this cargo-fastening unit for the roof-carrier is that in a roof-carrier having a horizontal bar being fixed on the roof top of a vehicle and also having a pivotal clamping bar being in parallel to the horizontal bar and being arranged to freely pivot to clamp and carry cargo between the bars, the horizontal bar and the clamping bar are respectively sectionalized into two parts at a suitable position to be joined by means of a detachable coupling bar.

The horizontal bar and the clamping bar are arranged to have a length approximately equal to the width of a load (including one or two sets of skis) so as to eliminate the idle excess portion of the bars possibly not being used because of fewer sets of loads being placed on the carrier, thus enabling the whole fastening unit to better absorb the impacts caused by vibrations and wind pressure during vehicle operation.

Further, the bars which are suitably sectioned in two parts to be joined by means of a detachable coupling bar not only enable the fastening unit to carry relatively more loads by employing another means as shall be explained hereinafter, but also make easier the carrying or storing of the unit in a compact state.

Another feature is that the horizontal bar and the clamping bar are respectively sectionalized in two parts such that a supplemental bar of a length is positioned between the respective two sections of the bars to be joined at both ends with the corresponding ends of the respective sections by means of a detachable coupling bar at each joint. The supplemental bars are preferred to have the same width as that of the other bars.

For example, if a carrier has a horizontal bar and a clamping bar, each bar having a length about equal to the width of one set of skis and such is intended to carry to sets of skis, a supplemental bar shall be employed in addition to clamp and carry another set of skis. Thus, all the bars employed for fastening loads on the carrier are put to full use without any idle portion resulting so as to enduce impacts from vibrations and wind pressure on vehicles for safe-carrying the loads.

Furthermore, for carrying three or more sets of loads, more supplemental bars may be employed in addition according to the additional sets of loads to be carried, in the same manner as the one discussed above employing one supplemental bar.

Besides, since the sectional joints of the bars are untidy in appearance and allow permeation of rain water which cause corrosion on the parts, a cover member is provided to cap the joint parts for protection and neat appearance.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
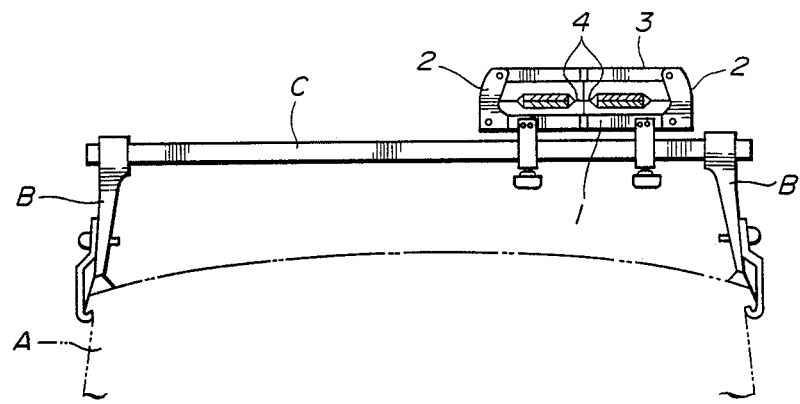
FIG. 1 is a front view of a roof-carrier with a cargo-fastening unit assembly.

Letter B in the drawings indicates a pair of support members being fixedly set up and facing each other on both sides of the roof of a vehicle A, the upper parts of the support members having respectively a horizontal through-opening to fit in and hold an end of a horizontal support bar C.

A horizontal bar 1 is fixedly attached on to the support bar C and has a length about equal to the width of two sets of skis (particularly as shown in the Figures), and both end parts of the bar 1 are fixed to a pair of lock members 2, such parts also having a portion which extends downward from the bar 1 to mount and fix it on the bar C.

Figure 2:
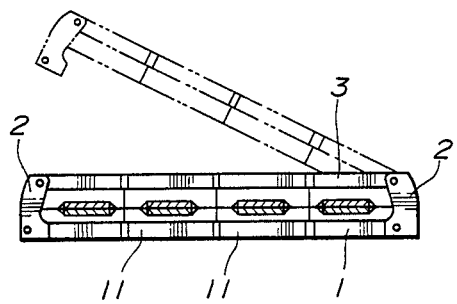
FIG. 2 is a front view of a cargo-fastening unit carrying four sets of skis.
Figure 3:
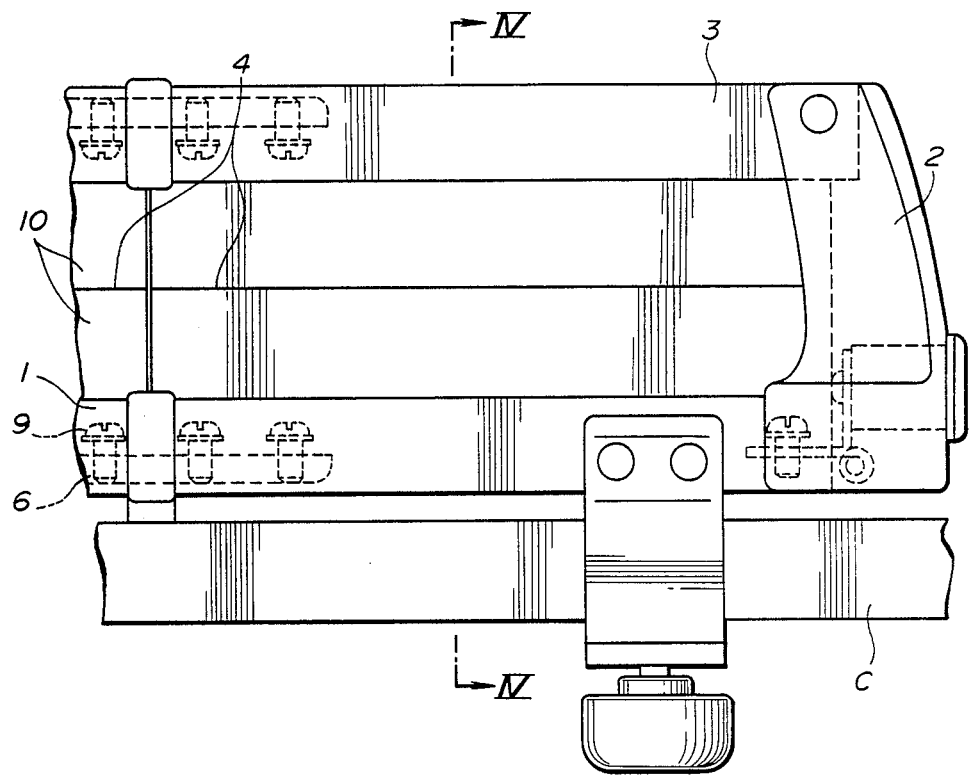
FIG. 3 is a partially enlarged front view of a fastening unit.
Figure 4:
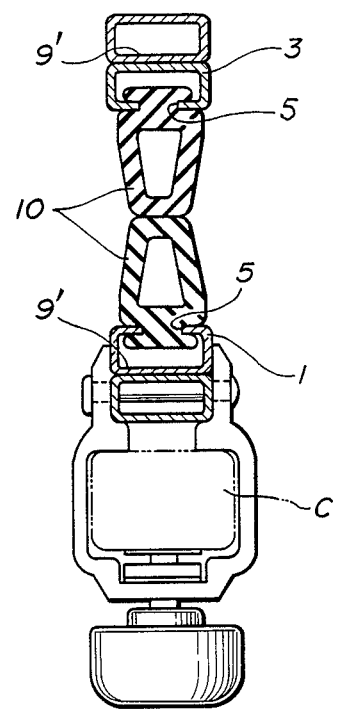
FIG. 4 is a sectional view along the line IV—IV in FIG. 3.
Figure 6:
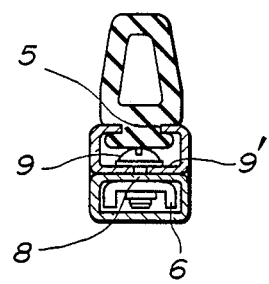
FIG. 6 is a sectional view along the line VI—VI in FIG. 5.
Figure 5:
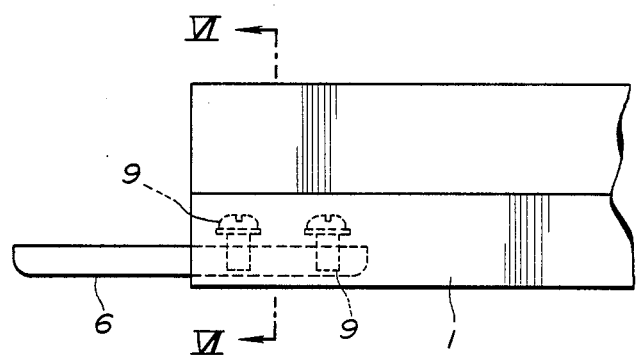
FIG. 5 is an illustration of a joint coupling.

A clamping bar 3 is about the same in width as the horizontal bar 1 and is pivotingly attached on the upper part above lock members 2. As shown in FIG. 2 by two-dot-dash lines, member 2 may be detachably attached on the bar 1 and the other end being attached to an end of the clamping bar 3 to allow it to pivot.

As shown in FIG. 1, the horizontal bar 1 and the clamping bar 3 are sectioned in two parts at about the mid-position. Both bars are made of metal in the structure of a "B" form in section, and the front sides of the bars facing each other in a unit assembly are provided with a long channel groove 5, respectively.

A coupling bar 6 having a plurality of tapped holes 8 is placed across over the joint 4 within the channel of the rear side of "B" structure to bridge the two sections. Screw bolts 9 are put through the middle wall of the bar from the side of the channel 5 to be screwed in the tapped holes 8 to join the respective sections of the bar 1 or 3.

A pair of cushion members 10, 10 of a very flexible material like synthetic rubber are firmly fitted with the respective rear part in the corresponding channel groove 5 of the sectioned bars 1 and 3, the front faces of the members 10, 10 facing each other in a butting relationship. The cushion members 10, 10 are also sectioned in two as in the bars 1 and 3.

In use, the clamping bar 3 is pivoted upward and two sets of skis are placed across the sides of the cushion members 10s of the horizontal bar 1 to be clamped by the pivotal clamping bar 3 and carried between the cushion members 10s of the horizontal bar 1 and the clamping bar 3 as shown in FIG. 1. Since the cushion members are made of a very flexible material like synthetic rubber, their cushioning effects are good enough to absorb any impact applied to the fastening unit from vibrations or wind pressure on the vehicle in operation.

Further, this device is designed to be marketed as a unit for separate attachment to an existing roof-carrier for a vehicle. Upon removing the detachable coupling bar 6 from the bars 1 and 3, the unit becomes sectioned in two parts to be packed into a compact size for easy carrying and storing.

In changing a fastening unit for use from carrying two sets of skis to carrying several sets as shown in FIG. 2, some supplemental bars 11, 11 being carried in reserve for possible needs may be employed in addition to match the additional sets to carry. That is, supplemental bars 11, 11 which are arranged to have a length about equal to the width of a ski and have the same structure and shape as those of the bars 1 and 3, shall be employed in two sets to be positioned between the respective sections of the bars 1 and 3 to be joined with one another. The joining method is the same as in the foregoing to employ two coupling bars 6 for rigid connection. The supplemental bars 11, 11 are also provided with the respective cushion members 10, 10 of a very flexible material in the same way as the other bars.

The embodiment shown in FIG. 2 is designed to clamp and carry four sets of skis, one for each unit section, between the cushion members 10, 10 as the bars 1 and 3 as well as between those of the supplemental bars 11, 11. Therefore, for carrying additional sets of loads, mere additions of the detachable supplemental bars 11, 11 in coupling the number of sets to match the number of additional sets to carry shall suffice for the need, and such a fastening unit leaves no idle portion of fastening members such that the whole unit becomes stronger so as to fully absorb the impacts from vibrations and wind pressure in operation.

Figure 7:
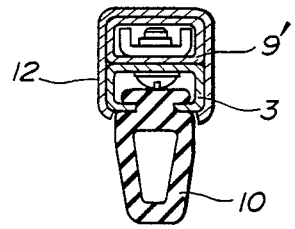
FIG. 7 is a view showing the state of a joint capped with a cover member.

Since the sectional joints of the bars 1, 3 and 11 are untidy in appearance and allow the entering of rain water through joints to cause corrosion in the unit, cover members 12 are preferably to be provided to cap the joints as in FIG. 7. Obviously, numerous modifications and variations of the present invention are possible in light of the above teachings. It is therefore to be understood that within the scope of the appended claims, the invention may be practiced otherwise than as specifically described herein.

What is claimed is:

1. A cargo-fastening unit, for use with a roof-carrier for a vehicle comprising:
    a horizontal bar and a clamping-bar pivotably connected in parallel with the horizontal bar at least one end portion of said horizontal bar so as to clamp and carry a load between said bars, wherein the horizontal bar and the clamping bar are respectively divided into first and second sections and at least one detachable coupling bar for separately joining said first and second sections.

2. The cargo-fastening unit claimed in claim 1, further comprising at least one supplemental bar positioned between said first and second sections and joined at opposite ends thereof with the first and second sections.

* * * * *